(12) United States Patent
Owens et al.

(10) Patent No.: US 6,622,935 B1
(45) Date of Patent: Sep. 23, 2003

(54) ARTICULATED CROP SPRAYING APPARATUS

(75) Inventors: James D. Owens, Plant City, FL (US); Gregory C. Farrar, Lake Wales, FL (US)

(73) Assignee: American Tank & Equipment Co., Inc., Plant City, FL (US)

( * ) Notice: Subject to any disclaimer, the term of this patent is extended or adjusted under 35 U.S.C. 154(b) by 190 days.

(21) Appl. No.: 09/935,201

(22) Filed: Aug. 22, 2001

Related U.S. Application Data

(60) Provisional application No. 60/227,347, filed on Aug. 23, 2000.

(51) Int. Cl.[7] .................................................. B05B 1/20
(52) U.S. Cl. ........................................ 239/77; 239/172
(58) Field of Search .......................... 239/77, 146, 159, 239/172, 290, 292, 300

(56) References Cited

U.S. PATENT DOCUMENTS

| 1,348,038 A | 7/1920 | Neumeyer |
| 1,526,642 A | 2/1925 | Nissley |
| 2,226,136 A | 12/1940 | Parker .......................... 43/148 |
| 2,297,110 A | 9/1942 | Parker .......................... 43/148 |
| 2,976,647 A | 3/1961 | Pickrell .......................... 47/58 |
| 3,472,454 A | 10/1969 | Blue et al. ..................... 239/77 |
| 4,893,755 A | 1/1990 | Keathley ..................... 265/267 |
| 4,927,080 A | 5/1990 | Alsing .......................... 239/77 |
| 5,028,002 A | 7/1991 | Whitford ........................ 239/8 |
| 5,098,018 A | 3/1992 | Hadar et al. ................... 239/77 |
| 5,326,030 A | 7/1994 | Benest ........................... 239/1 |
| 5,740,962 A | 4/1998 | Manor et al. .................. 239/77 |
| 5,921,019 A | 7/1999 | Baek |
| 5,971,295 A | 10/1999 | Jensen et al. .................. 239/77 |

Primary Examiner—Lisa A. Douglas
(74) Attorney, Agent, or Firm—Holland & Knight LLP

(57) ABSTRACT

Disclosed is a crop spraying system. The system includes an articulated spraying assembly that is secured to a tractor and/or a pull behind crop sprayer. The articulated assembly permits a fluid, such as an insecticide, to be effectively delivered to a commercial crop, such a citrus tree. Specifically, the fluid can be delivered upwardly from a pivotal boom that is preferably horizontally positioned at a location adjacent the ground. In this manner, the fluid is released upwardly from a position beneath crop canopies. The result is a more effective penetration of the crop by the dispensed fluid.

14 Claims, 5 Drawing Sheets

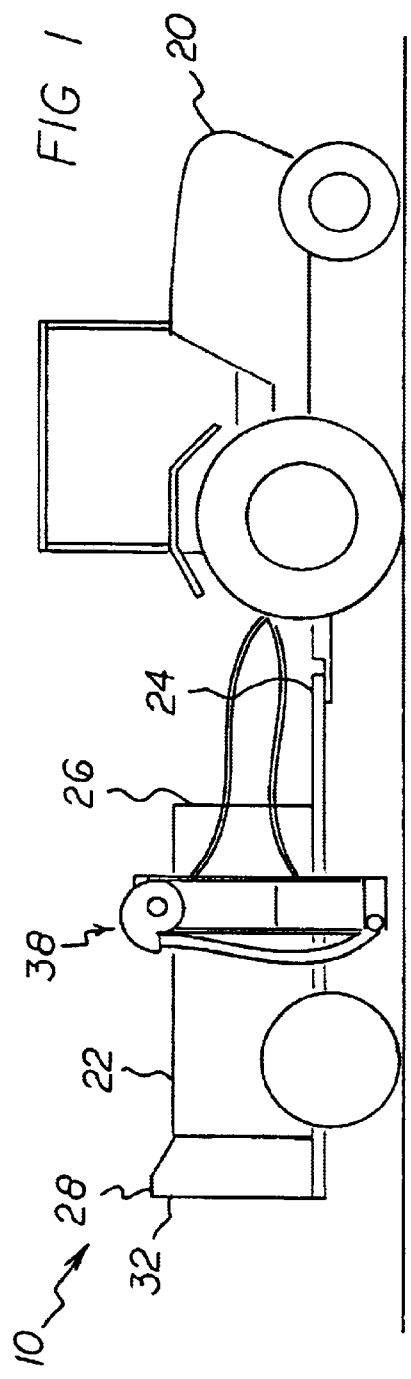
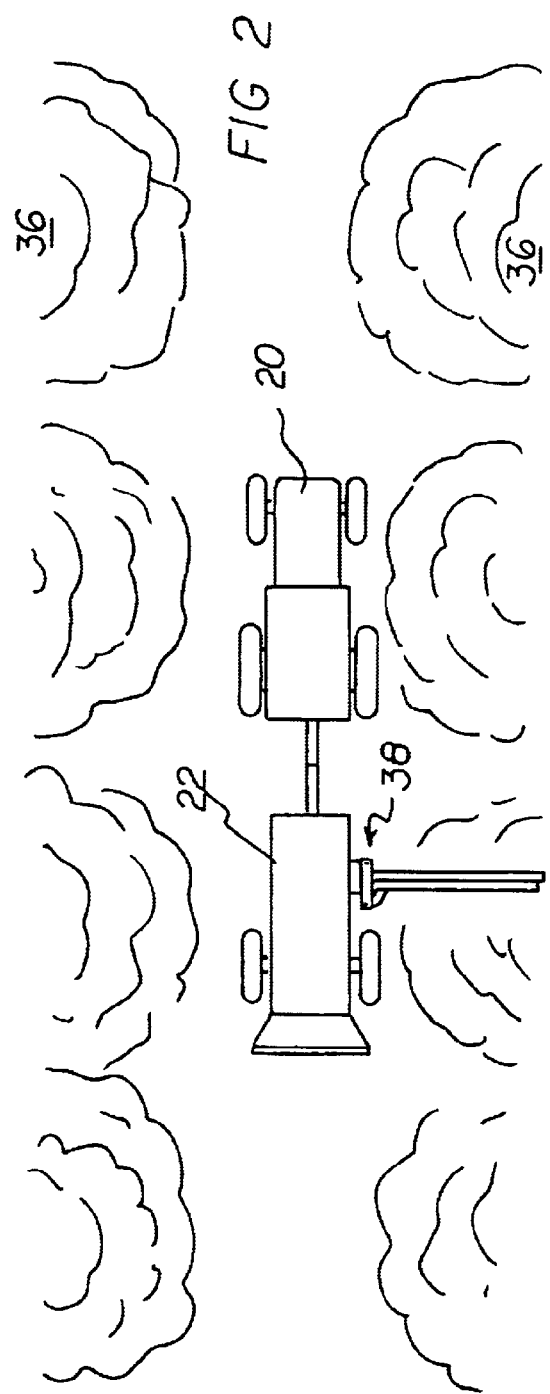

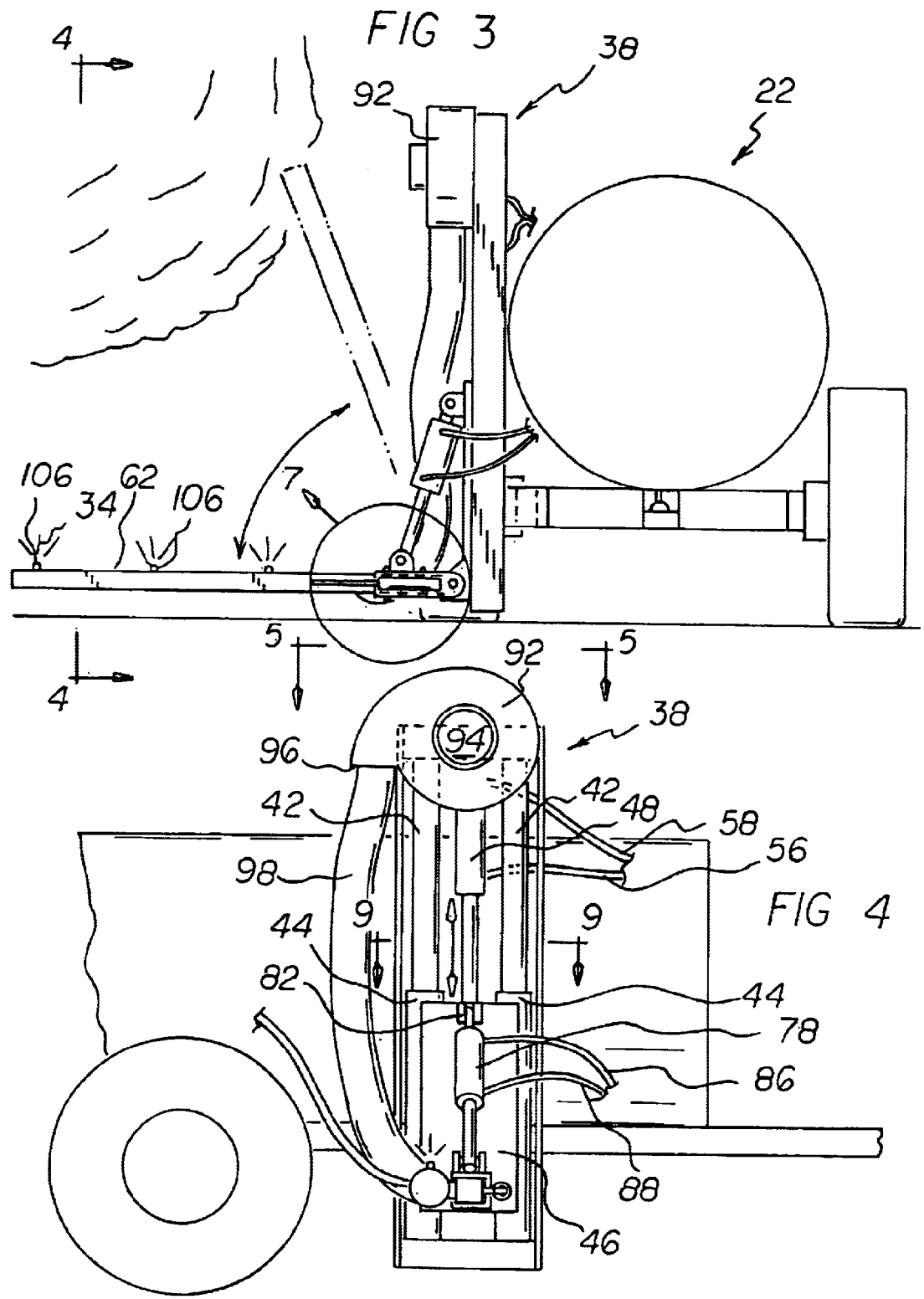

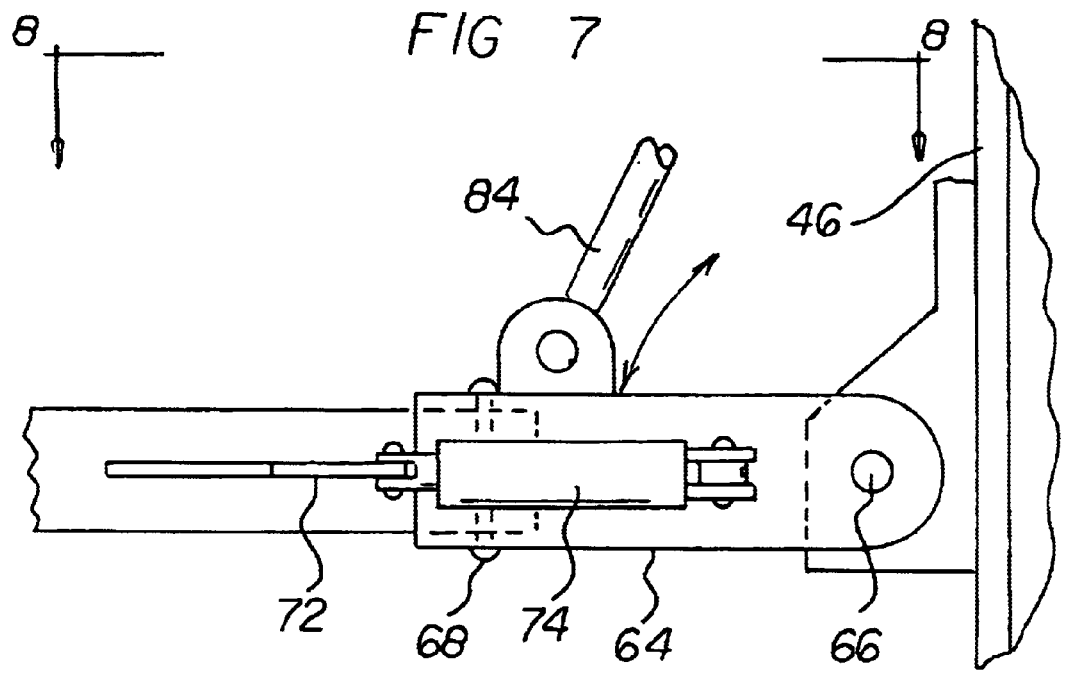
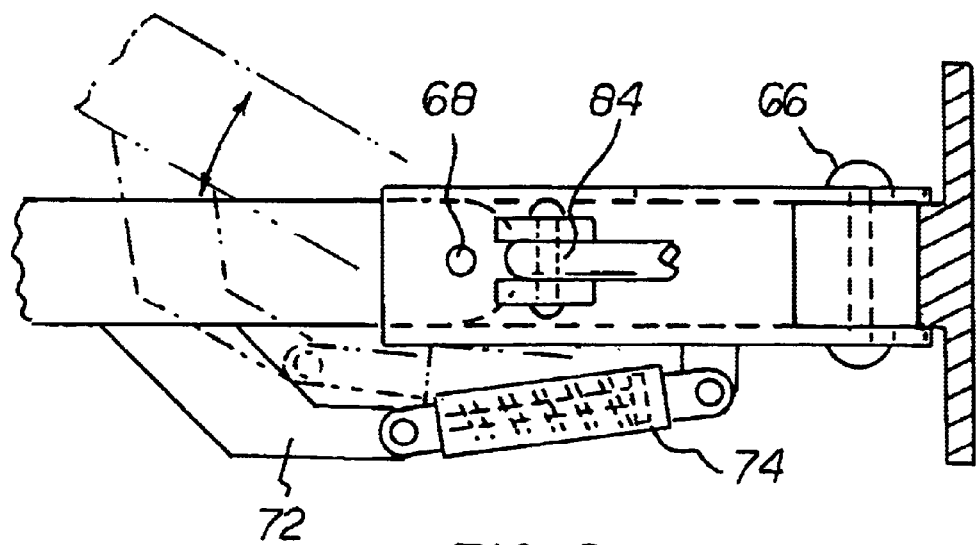

ARTICULATED CROP SPRAYING APPARATUS

RELATED APPLICATION DATA

This application claims priority from provisional application serial No. 60/227,347 filed on Aug. 23, 2000 entitled Citrus Sprayer, the contents of which are incorporated herein by reference.

BACKGROUND OF THE INVENTION

1. Field of the Invention

This invention relates to a crop spraying system. More particularly, the present invention relates to a crop spraying system that employs an articulated spraying assembly.

2. Description of the Background Art

The application of insecticides upon agricultural and horticultural crops is an essential part of farming, whether commercial or otherwise. Additionally, fungicides and/or herbicides can also be applied in place of or in addition to the insecticide. In this manner a farmer can prevent insects, fungus and/or weeds from destroying or otherwise damaging crops.

Application of the insecticide, herbicide or fungicide (i.e., treatment fluid) is governed by many practical factors, such as economic concerns. Namely, a farmer does not want to use an insufficient amount of treatment fluid for fear that crop production may be affected by pests. Conversely, the use of too much treatment fluid raises economic concerns in that treatment fluids are typically expensive, both in terms of the cost of the treatment fluid as well as the expense of its application. Additionally, environmental concerns are raised by excessive application of treatment fluid. Namely, excessive amounts of any pesticide can result in harmful effects to the crop, as well as to the humans that may be consuming the crops. Application of treatment fluids is further complicated by the fact that most targeted pests and organisms thrive on the underside surfaces of the leaf and fruit in the protective and shady dense foliage. Conventional spray machines utilize axial or squirrel cage fans to force assisted spray out over a tree or crop's canopy in the hope of penetrating the natural forming wall of leaves, known as leaf shingling. Such spraying is done in the hope of reaching through to the plant's structure. For obvious reasons, such as leaf shingling and windy conditions, conventional spraying is often ineffective. Consequently, farmers are continually seeking new and more efficient devices for applying treatment fluids to crops.

The background art contains numerous examples of various crop spraying devices. For instance, U.S. Pat. No. 5,921,019 to Baek discloses a spraying assembly for horticultural and agricultural applications. The apparatus includes two fan-driven spray units which are adapted to be sprayed upwardly into the foliage canopy so as to displace leaves in an upward and outward direction. The apparatus further includes an additional spray unit which is directed downwardly so as to spray into and partly through the canopy.

U.S. Pat. No. 5,740,962 to Manor et al. discloses equipment for the spraying of plants with a plant treating liquid. The equipment can be mounted upon an agricultural vehicle. Specifically, the vehicle carries a blower for pressurizing air and a main duct which is interconnected to flexible ducts and a container for holding treatment fluid. A series of controls are included for maneuvering the flexible ducts. In operation the equipment issues turbulent pulsating air streams in diverging directions.

U.S. Pat. No. 2,297,110 to Parker discloses a dusting apparatus which utilizes conduits on a carriage for the purpose of dry dusting the underside of citrus trees. The carriage includes powered blowers and a bin for containing a supply of insecticide. The conduits are pivotal about rotary joints.

Although each of the above-referenced inventions achieves its individual objective, they also form a common problem. Namely, none of the inventions contemplates the advantageous positioning of an underside crop spraying applicator through angular and vertical position controls.

SUMMARY OF THE INVENTION

It is therefore one of the objectives of this invention to provide a crop spraying apparatus which allows for the accurate positioning of a spray applicator.

It is also an object of this invention to provide a spray applicator which does not damage crops as It is applying treatment fluid.

Still another object of this invention is to provide a boom type of crop sprayer which is securable upon a tank towed behind a tractor.

Still yet another object of this invention is to provide a crop spraying device which can be readily adapted to fit upon existing agricultural equipment.

These and other objectives are accomplished by providing an articulated spray assembly which includes a guide rail and a slide to be coupled to the rail. A vertical control piston is secured both to the guide rail and to the slide, with the piston effecting vertical movement of the slide. A boom is pivotally connected to the lower extent of the slide. An angular controlled piston is pivotally interconnected to the slide and the boom for effecting pivotal movement of the boom relative to the slide. Additionally, a plenum is coupled to the boom and is interconnected to a supply of fluid and pressurized air. Nozzles are positioned within the plenum for delivering the fluid and pressurized air in atomized form to the underside of the crop. The vertical and angular controls permit the plenum to be advantageously positioned with respect to the crops.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a side elevational view of the crop spraying system of the present invention.

FIG. 2 is a top plan view of the crop spraying system, as well as the crops being sprayed.

FIG. 3 is a front elevational view of the system of the present invention.

FIG. 4 is a side elevational view taken from line 4—4 of FIG. 3.

FIG. 7 is a detailed view taken from FIG. 3.

FIG. 8 is a top plan view taken from line 8—8 of FIG. 7.

Similar reference characters refer to similar parts throughout the several views of the drawings.

DETAILED DESCRIPTION OF THE PREFERRED EMBODIMENT

Figure 5:
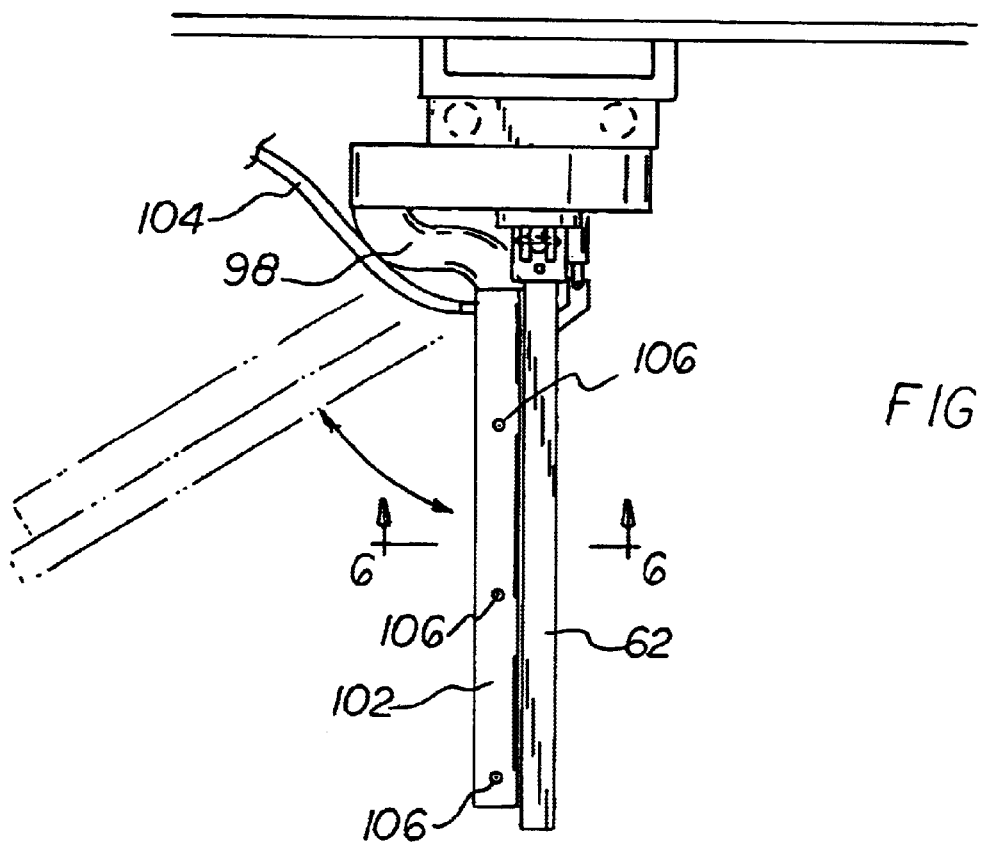
FIG. 5 is a top plan view taken from line 5—5 of FIG. 4.

The present invention relates to a crop spraying system. The system includes an articulated spraying assembly that is secured to a tractor and/or a pull behind crop sprayer. The articulated assembly permits a treatment fluid, such as an insecticide, to be effectively delivered to commercial crops, such as citrus trees. Specifically, the fluid can be delivered upwardly from a boom-type applicator, which can be horizontally positioned at a location adjacent the ground. In this manner, the fluid is released upwardly from a position beneath crop canopies. The result is a more effective penetration of crop foliage by the dispensed fluid. The various features of the present invention are elaborated upon more fully hereinafter.

With reference now to FIG. 1, the overall system 10 of the present invention is depicted. The system 10 includes a conventional motorized tractor 20 of the type typically employed in farming operations. The system 10 also includes a pull behind tank sprayer 22 that is releasably coupled to tractor 20 by way of a ball and hitch 24 or similar conventional coupling means. The tank sprayer 22 is defined by a first forward end 26 and a second rearward end 28. The second end 28 includes an enlarged fan-assisted discharge 32. The tank sprayer 22 permits the storage of a volume of treatment fluid 34 which is desired to be dispensed upon crops 36.

The treatment fluid 34 employed by the present invention can be any one of a variety of different fluids that are utilized in farming operations. For example, the fluid 34 can be an insecticide, a herbicide, a fungicide, and/or a liquid fertilizer. However, the present invention is not limited to any one of these fluids and can readily be used in conjunction with any other fluid which is beneficially applied to commercial or non-commercial crops. The fluid 34 within the tank is in communication with discharge end 28 of the tank to facilitate atomization and dispensing of the fluid 34 from the rearward trailing end 28 of sprayer 22. As such, tractor 20 can be driven between two rows of crops 36 with tank sprayer 22 employed in discharging atomized treatment fluid 34 outwardly over the crop canopies. A suitable tank spraying construction is made by Air O Fan Products Corporation of Reedley, Calif.

The system 10 of the present invention further includes an articulated spray assembly 38. This spray assembly 38 is mounted to tank sprayer 22 just forward of its two wheels. The articulated spray assembly 38 provides an additional means by which treatment fluid 34 can be distributed to crops 36. A detailed showing of the articulated spray assembly 38 is provided in FIGS. 3–10. With specific reference to FIG. 4, the guide rails 42 of the articulated assembly 38 are depicted. These guide rails 42 are secured to the frame of tank sprayer 22. The guide rails 42 can be secured in any number of ways such as by welding and/or bolted fasteners. As such, articulated assembly 38 can be retrofit to existing farm equipment, such a tank sprayer. It is also within the scope of the present invention to retrofit the articulated assembly 38 upon a tractor. When attached to tank sprayer. 22, guide rails 42 are secured such that they are oriented perpendicular to the frame of tank sprayer.22.

The two guide rails 42, which in the preferred embodiment are cylindrical, support two slides 44 which are slideably positioned over guide rails 42. The relationship between rails 42 and slides 44 is depicted in the cross sectional view ,of FIG. 9. Although rails 42 and slides 44 have been described as cylindrical, other shapes can readily be employed such as rectangular or oval. Additionally, other track arrangements are within the scope of the present invention, such as, or example, slides which only partially engage the underlying track, or which employ a worm-type gear. A support plate 46 is fastened between the two slides 44, together the two slides 44 and support plate 46 are adapted for linear movement along rails 42, as can be appreciated from the illustration in FIG. 4. Movement of slides 44 is affected by a hydraulically actuated vertical control piston 48. This piston 48 is interconnected at an upper extent 52 to the guide rails 42 and at a lower extent 54 to the support plate 46 that connects the slides 44 (note FIG. 10). Hydraulic supply and return lines (56 and 58, respectively) are included for selectively delivering and removing hydraulic fluid to control piston 48. A suitable supply of hydraulic fluid can be carried by, and controlled from, tractor 20. As such, hydraulic fluid can be supplied to piston 48 for use in effecting vertical upward and downward movement of the slides 44 and supporting plate 46. Although hydraulic fluid is preferred, other suitable working fluids (such as air) are within the scope of the present invention.

The articulated assembly 38 further includes a boom 62 that is pivotally interconnected to a lower extent of slides 44. The specific interconnection is depicted in FIGS. 7 and 8. As illustrated, boom 62 is interconnected to support plate 46 by way of a C-shaped bracket 64. The C-shaped bracket 64 has a first end that is connected to an extension of support plate 46 about a horizontally oriented pivot 66. This pivot can be achieved by any number of means known in the art such as, for example, a nut and bolt or a suitably secured pin or dowel. The C-shaped bracket 64 includes a second end which receives one end of the boom 62 at a vertically oriented pivot 68. Again, this pivot can be a nut and bolt or suitably secured pin or dowel. This arrangement permits the boom 62 to pivot about both a vertical and a horizontal axis (68 and 66) with respect to the support plate 46 and two slide members 44.

The pivoting of the boom 62 about the vertical axis 68 facilitates a break away function. Specifically, the boom 62 is permitted to pivot backward in relation to direction of the tractor 20 (note FIG. 5) such that boom 62 will not harm any vegetation and/or trees that may-come into contact with boom 62 during the course of crop spraying operations. FIG. 8 illustrates a dampener linkage that is interconnected between the boom 62 and C-shaped bracket 64. More specifically, a three bar linkage 72 is secured intermediate with bracket 64 and boom 62, with the intermediate linkage constituting a spring 74 which urges boom 62 into an orientation perpendicular to the plane of support plate 46. In the preferred embodiment, spring 74 is hydraulically assisted. As can be appreciated from FIG. 6, C-shaped bracket 64 has its closed end 76 facing towards the direction of tractor travel 20 such that boom 62 will not pivot forwardly with respect to the path of tractor 20. As such, boom 62 is only permitted to pivot rearwardly, as is the case when boom 62 comes into contact with foliage and/or trees. When this occurs, dampener 72 functions to retard the pivotal movement of boom 62. Additionally, when the obstruction is cleared, spring 74 functions in bringing the boom to its untensioned state, perpendicular to the direction of the tractor 20.

With reference again to FIG. 4, the angular control piston 78 of articulated assembly 38 is depicted. This control piston 78, which like the vertical control piston 48 is preferably hydraulically controlled, is pivotally interconnected to boom 62 and slides 44. More specifically, the angular control piston 78 is pivotally secured to supporting plate 46 at its upper end 82 and to the C-shaped bracket 64 at its lower end 84. Again, piston 78 is preferably coupled to a suitable source of hydraulic power by way of supply and return lines (86 and 88, respectively). This permits hydraulic fluid to be supplied to piston 78 to effect retraction of the piston and, thus, pivotal movement of boom 62 with respect to the two slides 44. This arrangement can be appreciated from the phantom showing of the boom depicted in FIG. 3. Supply of the hydraulic fluid, and movement of the boom 62 are controlled from onboard tractor 20.

The articulated spray assembly 38 further includes a fan 92 which is mounted to the upper extent of slides 44 as noted in FIGS. 3 and 4. This fan 92 preferably has an air intake 94 as well as a pressurized air outlet 96. Furthermore, fan 92 includes a duct 98 secured to the pressurized air outlet 96. The function of the duct 98 and fan 92 will be described in greater detail hereinafter.

An elongated tubular plenum 102 is coupled to the boom 62. The relationship between boom 62 and plenum 102 is most clearly depicted in the cross sectional view of FIG. 6. The plenum 102 can be constructed from any number of materials such as a PVC plastic or an elastomaric material. A fluid supply line 104 is included to route fluid 34 from tank sprayer 22 to the inside of plenum 102. As such, tank sprayer 22 and articulated spray assembly 38 derive their fluid 34 from the same source. Additionally, as can be appreciated from FIG. 4, plenum 102 is also adapted to receive a supply of pressurized air at its proximal end by way of air duct 98. Consequently, fan 92 functions in accepting ambient air, pressurizing it, and delivering it to plenum 102 by way of duct 98. This pressurized air permits the delivery of treatment fluid 34 in a manner which is described more fully hereinafter.

The fan 92 is powered from a suitable power source such as by way of the power take off (or PTO) that is available on most tractors. The power source permits the operator of tractor 20 to selectively operate the fan 92 and, consequently selectively pressurize plenum 102. In a similar manner, the operator also controls the delivery of fluid 34 from the tank 22 to the plenum 102. In this regard, the flow of fluid to the plenum 102 is controlled by a pump (not illustrated) that is powered from the tractor's PTO.

Figure 6:
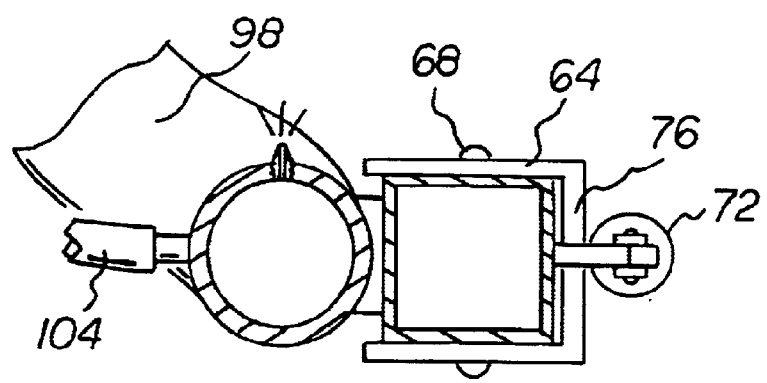
FIG. 6 is a cross sectional view taken along line 6—6 of FIG. 5.
Figure 9:
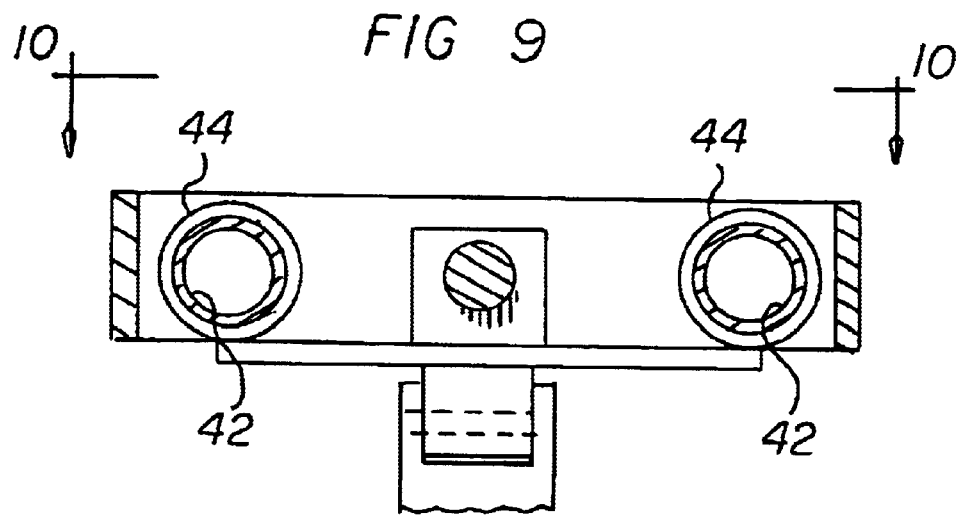
FIG. 9 is a cross sectional view taken along line 9—9 of FIG. 4.
Figure 10:
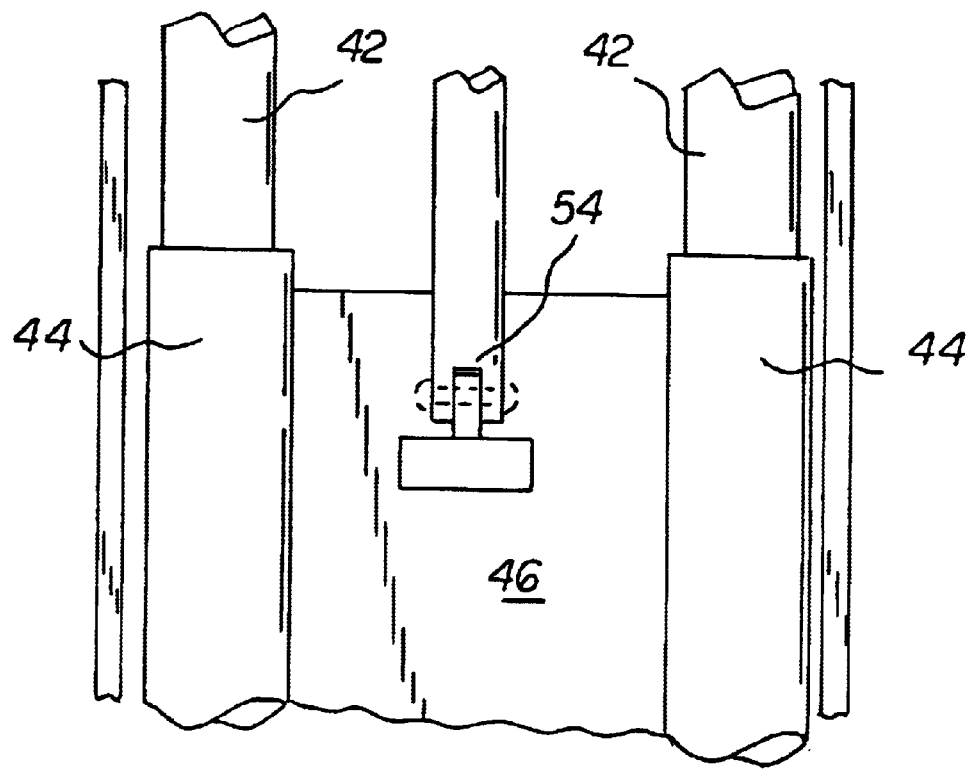
FIG. 10 is a detailed view of the guide rails and slides of the articulated assembly.

With reference now to FIGS. 5 and 6, the nozzles 106 of the plenum are depicted. These nozzles 106 are positioned through the outer wall of plenum 102 and, when boom 62 is oriented in a horizontal position, the nozzles 106 take an upward orientation. Consequently, when both fluid and pressurized air are delivered to plenum 102, the fluid is atomized and dispensed upwardly from the nozzles 106.

In operation a user would tow the tank sprayer 22 between a row of crops 36 in a conventional fashion and permit fluid 34 to be discharged from the rearward end 28 of tank sprayer 22. This fluid 34 would be dispensed over the outer surface of the crop canopy thereby delivering a volume of fluid 34 to the outer surface of such foliage. At the same time, the operator can control the dispensing of fluid 34 from articulated spray assembly 38. Specifically, the operator can control the supply of hydraulic fluid to both the vertical and angular control pistons (48 and 78). In this manner, the operator, while sitting in the tractor 20, can effect translation of the boom 62 vertically downward by way of the vertical control piston 48. Thereafter, the boom can be pivoted into a horizontal orientation adjacent the ground by way of angular control piston 78. In the preferred embodiment boom 62 is lowered to a position approximately eight inches above the ground. With this orientation, boom 62 extends beneath the crop canopy. In most instances, boom 62 reaches to the base of adjacent trees by a distance of approximately twenty-four inches.

Thereafter, the operator can power the fluid pump to thereby deliver fluid 34 into plenum 102. However, such fluid 34 at this stage will only be delivered upwardly through nozzles 106 a short distance. Immediately after starting the fluid supply the operator can power fan 92 to thereby deliver pressurized air inside the plenum 102. This pressurized air then causes the fluid 34 within plenum 102 to become atomized and dispensed upwardly to the underside of the canopy to effectively penetrate deep within the canopy of the crop. The result is a more effective crop treatment. Effective penetration is also facilitated by the air turbulence generated by the tandem arrangement of tank sprayer 22 and articulated sprayer 38.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A crop spraying system adapted to deliver an atomized fluid to the underside of crop canopies, the system comprising:

a tank sprayer having a first end releasably coupled to a tractor, a fan assisted discharge at a second end of the sprayer, the tank including a volume of fluid in communication with the discharge to facilitate atomization and dispensing of the fluid;

an articulated spray assembly mounted to the tank sprayer, the assembly including guide rails secured to the tank sprayer and slides coupled to the rails, a hydraulically actuated vertical control piston interconnected to the guide rails and the slides for effecting vertical movement of the slides upon the rails, a boom pivotally interconnected to a lower extent of the slides about horizontal and vertical axes, a dampener interconnected to the boom and rails for limiting the pivotal movement of the boom about the vertical axis, a hydraulically controlled angular control piston pivotally interconnected to the slides and boom for effecting the pivotal movement of the boom relative to the slides, a fan interconnected to the guide rails, the fan having an air intake and a pressurized air outlet;

an elongated tubular plenum coupled to the boom, a fluid supply line connected to the plenum for delivering fluid from the tank, an air duct connecting the outlet of the fan to the plenum, a series of nozzles positioned within the plenum.

2. An articulated spray assembly comprising:

a guide rail and a slide coupled to the rail, a vertical control piston interconnected to the guide rail and the slide for effecting vertical movement of the slide upon the rail, a boom pivotally interconnected to a lower extent of the slide, an angular control piston pivotally interconnected to the slide and boom for effecting the pivotal movement of the boom relative to the slide;

a plenum coupled to the boom, the plenum being interconnected to a supply of fluid and pressurized air, a series of nozzles positioned within the plenum, wherein delivering fluid and pressurized air to the plenum results in the fluid being atomized and dispensed from the nozzles and wherein the plenum can be advantageously positioned by way of the vertical and angular controls.

3. The articulated spray assembly as described in claim 2 wherein the assembly is mounted upon a tank sprayer having a first end releasably coupled to a tractor, and a fan assisted discharge at a second end of the sprayer, the tank sprayer including a volume of fluid in communication with the discharge to facilitate atomization and dispensing of the fluid, the volume of fluid also supplying fluid to the, plenum.

4. The articulated spray assembly as described in claim 2 wherein the vertical and angular control pistons are hydraulically actuated.

5. The articulated spray assembly as described in claim 2 wherein a fan is connected to the guide rail and wherein the fan includes an air intake and a pressurized air outlet and wherein the air outlet supplies pressurized air to the plenum.

6. The articulated spray assembly as described in claim 2 wherein the plenum has an elongated tubular cross section.

7. The articulated spray assembly as described in claim 2 wherein the assembly is mounted to a conventional tractor.

8. The articulated spray assembly as described in claim 2 wherein a pair of guide rails are included and wherein a pair of slides are mounted upon the guide rails.

9. The articulated spray assembly as described in claim 2 wherein the boom is pivotally interconnected to the lower extent of the slide about both vertical and horizontal axes.

10. The articulated spray assembly as described in claim 2 wherein a dampener is interconnected to the boom for limiting the pivotal movement of the boom about the vertical axis.

11. An articulated crop spraying apparatus adapted for spraying the underside of crops, the apparatus comprising:

an elongated plenum adapted to be pressurized by a source of air, the plenum being in fluid communication with a source of fluid;

a vertical control assembly for translating the elongated plenum in the vertical orientation;

an angular control assembly for orienting the plenum in the angular orientation;

a series of nozzles positioned within the plenum such that when the plenum is horizontally oriented, the nozzles are directed upwardly to permit fluid to be discharged and atomized upwardly with the assistance of the pressurized air.

12. The articulated assembly as described in claim 11 wherein the assembly is secured upon a tractor.

13. The articulated assembly as described in claim 11 wherein the assembly is secured to crop sprayer.

14. The articulated assembly as described in claim 11 wherein the vertical and angular control assemblies are hydraulically actuated.

* * * * *